United States Patent [19]

Edgington et al.

[11] Patent Number: 5,753,724
[45] Date of Patent: May 19, 1998

[54] BIODEGRADABLE/COMPOSTABLE HOT MELT ADHESIVES COMPRISING POLYESTER OF LACTIC ACID

[75] Inventors: Garry J. Edgington, White Bear Lake; Christopher M. Ryan, Dayton, both of Minn.

[73] Assignee: H. B. Fuller Licensing & Financing, Inc., St. Paul, Minn.

[21] Appl. No.: 786,430

[22] Filed: Jan. 21, 1997

Related U.S. Application Data

[62] Division of Ser. No. 632,918, Apr. 16, 1996, abandoned, which is a continuation of Ser. No. 136,670, Oct. 15, 1993, abandoned.

[51] Int. Cl.$^6$ .................... C08L 67/04; C08G 63/08; C08F 120/26
[52] U.S. Cl. .................... 523/124; 523/125; 523/128; 524/317; 524/320; 525/450; 525/415
[58] Field of Search .................... 523/124, 125, 523/126, 127, 128; 524/270, 271, 272, 274, 306, 310, 312, 313, 315, 317, 320, 322, 294, 296, 297; 525/450, 415; 528/359, 361, 35; 156/327, 336

[56] References Cited

U.S. PATENT DOCUMENTS

| | | | |
|---|---|---|---|
| 4,661,530 | 4/1987 | Gogolewski et al. | 521/137 |
| 5,180,765 | 1/1993 | Sinclair | 524/306 |
| 5,216,050 | 6/1993 | Sinclair | 524/310 |
| 5,252,642 | 10/1993 | Sinclair et al. | 524/320 |
| 5,252,646 | 10/1993 | Iovine et al. | 524/272 |
| 5,312,850 | 5/1994 | Iovine et al. | 524/271 |
| 5,424,346 | 6/1995 | Sinclair | 524/320 |
| 5,444,113 | 8/1995 | Sinclair et al. | 524/317 |
| 5,502,158 | 3/1996 | Sinclair et al. | 524/315 |

*Primary Examiner*—Peter A. Szekely
*Attorney, Agent, or Firm*—Nancy Quan; Carolyn Fischer

[57] ABSTRACT

A hot melt adhesive composition can be made using a polyester derived from 2-propanoic acid (lactic acid). A thermoplastic resin grade polyester can be formulated into a functional adhesive using adhesive components. A lower molecular weight material can be used as a tackifying resin with a biodegradable/compostable resin in a formulated hot melt adhesive. The adhesive material can be made pressure sensitive and can be made entirely by a degradable by combining the polyester polymer with other biodegradable/compostable ingredients. The resulting adhesive composition that can be used in a variety of applications. The biodegradable/compostable adhesive material can be used as a substitute for non-biodegradable materials made from commercial polymers that resist attack by bacteria, fungi and other microbial populations. The hot melt adhesives can be used in (e.g.) packaging and the manufacture of disposable articles which are made from degradable materials. The entire disposable article can be made from adhesives and structural materials that are fully biodegradable/compostable.

20 Claims, No Drawings

BIODEGRADABLE/COMPOSTABLE HOT MELT ADHESIVES COMPRISING POLYESTER OF LACTIC ACID

This application is a division of U.S. Ser. No. 08/632,918 filed Jun. 16, 1996 now abandoned which is a continuation of U.S. Ser. No. 08/136,670 filed Oct. 15, 1993 now abandoned.

FIELD OF THE INVENTION

The invention relates to biodegradable/compostable adhesive compositions that are useful in a variety of applications. The adhesives can take virtually any form, but preferably are used as hot melt adhesives. Such adhesives can be used in applications including case and carton sealing, book binding, bottle labeling, film laminating, etc. More particularly, the adhesives can be formulated to produce hot melt pressure sensitive properties and can be applied in the construction of disposable articles including infant diapers, incontinent pads and sanitary applications.

BACKGROUND OF THE INVENTION

Adhesive compositions are commonly manufactured by combining thermoplastic resins or similar polymeric materials with available plasticizers, tackifiers and other additives to produce a wide range of adhesive properties. Common tackifiers or plasticizers are petroleum based or are derived from naturally occurring feedstocks, such as wood, tall oil rosin and terpenes. Synthetic resin materials used in these adhesives include vinyl resins such as polyethylene or polypropylene; a variety of polyester resins; polycarbonate materials; block copolymers such as styrene isoprene styrene, styrene butadiene styrene, and similar resins. Synthetic resin technology has become very advanced. Typically, these polymeric resins are usually made from petroleum sources, have attractive fiber and structural properties, are low in cost and are easily processed. Formulation technology for the manufacture of a variety of blended useful products is well advanced. Many synthetic resin materials can be biodegradable/compostable and can be recycled. However, the chemical nature of the materials used in the formulation HMAs is such that no currently available blend of the resin or polymer material with other components is fully subject to degradation by microbial populations in the biodegradable/compostable context. A substantial need has arisen for adhesives and, in particular, hot melt adhesives that are biodegradable/compostable in the appropriate environment including municipal composting facilities.

One effort to manufacture partially biodegradable/compostable adhesives is disclosed in Kauffmann et al., U.S. Pat. No. 5,169,889, which discloses a hot melt adhesive composition made by combining a linear polyester comprising 3-hydroxy butyric acid and 3-hydroxy pentanoic acid (3-hydroxy valeric acid) (PHBV). These PHBV materials known under the tradename BIOPOL® are sold by Zeneca. The PHBV polymers are versatile polymers that are environmentally degradable. The PHBV polymer containing adhesive compositions, disclosed in Kauffmann et al., are not fully biodegradable/compostable because of other materials in the polymer blend. Both non-biodegradable tackifiers and plasticizers are used. These adhesive formulations can still resist substantial biodegradation because of the presence of non-degradable components. Edgington, G. J., Ryan, L. L., Biodegradable Hot Melt Adhesives. Paper Presented at the INDEX 93 International Congress for the Nonwovens Industries, Geneva, Switzerland, 1993. Accordingly, a substantial need exists to develop biodegradable/compostable adhesive compositions, particularly hot melt adhesive compositions comprising a thermoplastic resin, a tackifier and a plasticizer (each fully biodegradable/compostable) that can be blended in a hot melt product to obtain adhesive, preferably pressure sensitive adhesive properties.

BRIEF DESCRIPTION OF THE INVENTION

We have found a biodegradable/compostable tackifying resin, having a molecular weight less than 30,000, preferably less than 20,000 based on 2-hydroxy propanoic acid (lactic acid) that can be combined with biodegradable/compostable polymers or resins to form fully formulated biodegradable/compostable hot melt adhesives and hot melt pressure sensitive adhesives. We have further found classes of biodegradable/compostable thermoplastic resins having a molecular weight greater than 30,000, that can be used with the tackifier of the invention. Such resins include but are not limited to a high molecular weight polylactic acid polymer, a polyester urethane or a high molecular weight PHBV polymer. Further, we have identified compatible small molecule compostable plasticizers that can be combined with the compostable thermoplastic resins and the tackifying resins of the invention.

In the broadest aspect of the invention, we have found that the polylactic acid (PLA) material can be useful as an adhesive (used on a 100 wt-% basis) or as a resin or tackifier component in adhesive compositions and can provide a variety of useful properties. If combined with other degradable or compostable materials, the fully formulated adhesive can be biodegradable/compostable in appropriate environments.

A first aspect of the invention resides in the biodegradable/compostable tackifying resin, based on a PLA. Preferred materials have a molecular weight of less than or equal to 30,000, preferably less than 20,000 grams per mole comprising 2-hydroxy propanoic acid. Further, the tackifying resins can be modified to improve their tackifying utility in adhesive compositions. Lactic acid can act directly as a food source for microbial populations. The tackifying resins containing substantial amounts of lactic acid are directly degradable/compostable.

A second aspect of the invention provides a thermoplastic resin used in the formulation of biodegradable/compostable hot melt adhesive. Such thermoplastic resins include, but are not limited to: (1) a thermoplastic polylactic acid polymer resin, (2) a resin grade or high molecular weight thermoplastic polyester such as a polyester urethane, or (3) a thermoplastic PHBV polymer with the tackifying resin of the invention. Such adhesive compositions can also be manufactured using fully biodegradable/compostable 2-hydroxy-propionic acid based tackifiers which we have identified as fully degradable. Edgington, G. J., M. Mulligan, Compostable Hot Melt Adhesives: An Update, Paper presented at the Insight 93 International conferences, Toronto Canada 1993. The fully formulated biodegradable/compostable adhesive compositions can comprise from 10–90 wt-% of the 2-hydroxy propanoic acid based tackifying resins of the invention; 10–50% of a thermoplastic polyester urethane, a polylactic acid resin (Mn greater than 20,000 grams per mole) or a PHBV thermoplastic resin containing 5–35 wt-% of the hydroxy valerate component; 0–45 wt-% of degradable compostable ester plasticizer; and 0–5 wt-% of a stabilizer or stabilizer package. The term "tackifying agent" typically refers to a relatively low molecular weight material that when added to a thermoplastic resin results in a composition having substantial and measurable tack.

DETAILED DESCRIPTION OF THE INVENTION

The tackifying resin materials of the invention can be biodegradable/compostable amorphous resins made from at least 5 mole-%, preferably 10 mole-% or most preferably 50 mole-% of either a d-2-hydroxy propanoic acid, or a 1-2-hydroxy propanoic acid or mixtures thereof.

Useful tackifier resins of the invention can contain as little as 5 mole-% 2-hydroxy-propanoic acid in a polymer with other reactive polymer forming materials. Either the d-isomer or the 1-isomer or mixtures of isomers can be used. Preferred tackifier grade materials are polymers made using 2-hydroxy propanoic acid commonly and having at least 0–100 mole-%, preferably 50–95 mole-%, most preferably 50–85 mole-% of 1-2-hydroxy propanoic acid in the polyester, the balance comprising d-2-hydroxy propanoic acid or other polymerizable reactive monomer compounds. These materials can be made in combination with other biodegradable/compostable monomers including hydroxy substituted carboxylic acid, amine substituted carboxylic acid; mono-, di- or tricarboxylic acid materials; mono- di, tri- or other polyol materials. The polyesters of the invention can be homopolyesters comprising repeating units derived solely from either d- or 1-2-hydroxy propanoic acid monomer or mixtures thereof or a copolyester made from the 2-hydroxy propanoic acid or other monomer materials. Polymers comprising 2-hydroxy propanoic acid can be made by polymerizing the free 2-hydroxy propanoic acid monomer or by polymerizing lactide, a stable cyclic dimer comprising 2 moles of 2-hydroxy propanoic acid or by transesterification or hydrolysis of high molecular weight polylactide. In addition to the 2-hydroxy propanoic acid starting material, other comonomers can be used including lactones such as epsilon capro-lactone, beta-propio-lactone, alpha,alpha-dimethyl-beta-propio-lactone, dodecano-lactone, lactams such as capro-lactam, other hydroxy acids such as glycolic acid, 3-hydroxy butyric acid, 3-hydroxy valeric acid, amino acids such as phenylalanine, glycine and valine, etc. Additional useful monomers are disclosed in Murdock, U.S. Pat. No. 4,800,219. The homopolyester and copolyester materials can also be made from aromatic mono-, di- or tri-carboxylic acids or from monohydroxy alcohols and polyols comprising diols and triols. The carboxylic acid materials that can be used in the invention typically contain at least 1, 2, or 3 free reactive carboxyl groups attached to a substantial hydrocarbon moiety. Examples of such acids include benzoic acid, oxalic acid, succinic acid, maleic acid, fumaric acid, citriconic acid, 1,6-hexanedioic acid, phthalic acid, terephthalic acid, adipic acid and others. Further low and high molecular weight monohydroxy alkanols, diols and triols can be used in manufacturing the polyesters of the invention. Such alcohols include methanol, ethanol, isopropanol, n-butanol, benzyl alcohol, such polyol compounds include ethylene glycol, propylene glycol, glycerine, polyethylene glycol (polyoxyethylene made by polymerization of ethylene oxide) compounds, polypropylene glycol (polyoxypropylene made by polymerization of propylene oxide) compounds and other well known polyol materials.

When formed, such tackifying resins may have pendant hydroxy and carboxyl functionality that can be reacted with an isocyanate compound to form polyester urethane materials. Typically, an amount of the isocyanate compound is used such that little or no free reactive isocyanate groups are left in the urethane material. Any minimal residual of active isocyanate groups can be reacted to destroy NCO reactivity. Such NCO groups can be reacted with water or other small molecule active hydrogen containing compounds such as alcohols, thiols, small molecule carboxylic acids, etc.

The homopolyester and copolyester tackifying resin may be synthesized by polymerization directly from hydroxy acid precursors or by polymerization of cyclic monomers of the hydroxy acid or amide precursors or from the cyclic dimeric lactone of the hydroxy acid precursor. Preferably, the preferred tackifier materials are made by polymerizing the 2-hydroxy propanoic acid monomer. Tackifier materials of the invention commonly have a molecular weight of at least 500 g/mole, preferably about 2000 to 6000. The preferred tackifier has a glass transition temperature greater than about 0° C. and less than 60° C., preferably between about 20° and 50° C.

As little as 5 mole-% of the 2-hydroxy-propanoic acid can in a preferred system make a noncompostable material into a biodegradable/compostable material. The random distribution of the 2-hydroxy-propanoic acid units provide degradable sites in the molecule that can be cleaved by hydrolysis or microbial populations. The materials after degradation have substantially reduced molecular weights and improved bioavailability.

The homopolyester and copolyester tackifying resins of the invention are commonly made by known commonly available general condensation polymerization procedures wherein the monomer or mixture of monomers are raised to an elevated temperature sufficient to form an ester bond and volatilize the reaction by-product which is commonly water, when the reaction is between a free hydroxyl and a free carboxyl group. If an esterified carboxyl is reacted with a free hydroxyl group to form a ester linkage, the reaction by-product is often a lower alcohol which can be removed by the action of heat and/or vacuum using well understood esterification condensation polymerization procedures. Commonly, the monomer material(s), blended in appropriate proportions with catalysts or stabilizer materials, are introduced into a heated melt reaction chamber until they reach an adequate polymerization temperature which commonly ranges from about 100° C. to about 300° C., preferably about 150° C. to about 230° C. The reactions tend to be exothermic in nature and can be driven to produce high molecular weight polyester material. A number of catalysts have been discovered for use in the manufacture of the polyester materials including anionic substituted ion exchange resins, transition metal catalysts including titanium tetrabutoxide, stannic alkoxides, stannous alkoxides, stannous octoate, stannous oleate, etc. The catalysts are often used in amounts that range from about $10^{-5}$ to $10^{-3}$ moles of catalyst per mole of total monomer material.

The low molecular weight polyesters described above can be effective tackifiers for high molecular weight thermoplastic resin grade biodegradable/compostable polymer materials. A variety of resin grade thermoplastic resins can be tackified using the low molecular weight poly-2-hydroxy propanoic acid based material.

The tackifying resin compositions of the invention can be combined with thermoplastic resins that are biodegradable or compostable to form adhesive compositions. Biodegradable or compostable resins typically contain hydrolyzable bioreactive functional groups, linking substantially hydrocarbon groups, that can be attacked typically by microbial (bacterial or fungal) populations and can act as a food source from the population. Typical biodegradable reactive groups include ester groups (—O—CO—), urea linkages (—NH—CO—NH), carbamate links (—O—CO—NH—), amide (—CO—NH—), etc. Such linkages can be chemically degraded or attacked by the microbial populations substantially reducing the molecular weight of the resin to materials that can be absorbed in and metabolized by commonly available microbial populations. The biodegradable/compostable thermoplastics commonly have a molecular weight of greater than about 20,000 preferably greater than 30,000 and often include regions that produces substantial crystallinity upon cooling.

We have found three broad classes of useful thermoplastic resins that can be used in adhesives of the invention. Such thermoplastics include high molecular ($M_n$>20,000, preferably >30,000) weight polylactic acid resins, PHBV resins, and polyester urethane thermoplastics.

The preferred thermoplastic resin comprises high molecular weight linear polyesters of polylactic acid (2-hydroxy propionic acid). The preferred linear polyesters comprise a substantial proportion greater than 75 wt-%, preferably greater than 85 wt-% of 2-hydroxy propionic acid in a polymer that has a molecular weight of greater than about 30,000 and preferably greater than about 40,000. The highly preferred linear polyesters comprising lactic acid have at least 90 mole-% of the lactic acid monomer in the 1-lactic acid isomer. Preferably greater than 90 wt-% of the lactic acid monomer is in the 1-isomer. Such thermoplastics can be made as described above using conditions that promote formation of high molecular weight materials.

A preferred class of thermoplastic resins useful in the adhesive compositions of the invention include polyester urethane compositions. Such materials are typically made by reacting a polyisocyanate compound (typically an isocyanate compound having two or three isocyanato groups on an aromatic or aliphatic nucleus) with a polyester material. Preferred polyester materials are made by reacting a hydroxy compound having two or more hydroxy groups with an acid compound having two or more carboxyl groups to form the polyester backbone. Preferred hydroxy compounds that can be used in manufacturing the polyester urethane compounds of the invention include ethylene glycol, propylene glycol, 1,4-butene glycol, polymers made from ethylene oxide, propylene oxide, butylene oxide having two or more free hydroxyl groups and other similar diol, triol, polyol compounds. Useful acids that can be used in making the polyester urethanes of the invention include di- and tri-carboxylic acid substituted compounds. Such acids can include oxalic acid, malic acid, maleic acid, phthalic acid, terephthalic acid, pyromellitic acid and others. The polyester materials can also be made of hydroxy-carboxylic acid containing compounds. Such compounds include hydroxy acids such as lactic acid, hydroxybutyric acid, etc. and polymer materials such as polycaprolactone diols, polyethylene glycols, etc. The hydroxy compound and the acid compound is typically reacted under condensation reaction conditions with the removal of water to form ester bonds resulting in the formation of the thermoplastic polyester resin material.

Another preferred thermoplastic resin material for use in the hot melt adhesives of the invention comprises a linear polyester of 3-hydroxy butyric acid (HB) and 3-hydroxy valeric acid (HV). Such a polyester is produced by the fermentation of sugars by the bacteria alcaligenes eutrophus. Such materials are available from Zeneca known as BIOPOL® polymers, and typically contain about 5-35 wt-% of the hydroxy valerate component, the balance being hydroxy butyrate.

The hot melt adhesive compositions of the invention can contain a plasticizer compound. Plasticizers can improve the melt properties of the adhesives, can impart pressure sensitive properties, can extend the adhesive reducing cost and can increase the flexibility and melt properties of the hot melt adhesive. The preferred plasticizers for use with the hot melt adhesives of the invention are biodegradable/compostable plasticizers. Such plasticizers typically comprise naturally recurring oils or synthetic materials manufactured containing ester or urea carbamyl or amido groups as discussed above. However, plasticizer materials are different than the thermoplastic resins discussed above in terms of molecular weight. Plasticizer compounds are typically liquid or low melting small molecule solid materials having a molecular weight less than about 5000, preferably less than 1000, that can provide plasticizer properties to the compositions of the invention. Preferred classes of plasticizer materials for use in the invention comprise natural fats and oils compatible with the thermoplastic resins disclosed herein. A further preferred class of plasticizers for use in the adhesives of the invention include ester plasticizers typically made by reacting aromatic or aliphatic small molecule mono-, di- or triols with an aromatic or aliphatic acid compositions. Specific examples of preferred plasticizers include castor oil, TegMer 809-PEG 400 di-2-ethylhexoate ester, Plasthall DBS-dibutyl sebacate, Plasthall DIBA diisobutyl sebacate, Santizer 160, which is a butyl benzyl phthalate, polycaprolactone diols having a molecular weight of about 500 g/mole, a melting point less than about 25° C., ethylene glycol dibenzoate, propylene glycol dibenzoate, diethylene glycol dibenzoate, dipropylene glycol dibenzoate, pentaerythritol tetrabenzoate, sucrose benzoate.

Castor oil comprising an oil obtained by cold pressing seeds of Ricinus Communis L comprising triglycerides of fatty acids comprising 87 wt-% ricinoleic acid, 7 wt-% oleic acid, 3% linoleic acid, 3% palmitic acid, 1% stearic acid, and trace amounts of other fatty acids can be used. Other natural oils of vegetable sources which have an $I_2$ value of about 100 or less can be useful for the hot melt adhesives of the invention.

Apart from useful tackifiers and plasticizers used to obtain the final adhesive properties, other suitable additives such as dyes, pigments, fillers, antioxidants, stabilizers, etc. may be employed in the polyester materials in conventional amounts. Such additives may be added directly to a reaction mixture or may be post-added to the final polymer before or after final formulation is complete.

FORMULATIONS

The hot melt adhesive compositions of the invention can comprise formulations set forth in Table I found below.

TABLE I

| | Wt % | | |
|---|---|---|---|
| Ingredient | Useful | Preferred | Most Preferred |
| Formulations A | | | |
| Resin Grade Thermoplastic PLA[1] ($M_n$ > 30,000 gm/mole, high - mw) | 0–100 | 10–50 | 15–35 |
| PLA Tackifier | 20–100 | 20–90 | 35–75 |

TABLE I-continued

| Ingredient | Wt % | | |
|---|---|---|---|
| | Useful | Preferred | Most Preferred |
| Plasticizer | 0–45 | 15–50 | 15–40 |
| Stabilizer | 0–5 | 0–3 | 0.01–2 |
| Formulations B | | | |
| Resin Grade Thermoplastic Polyester Urethane | 0–50 | 10–50 | 15–40 |
| PLA Tackifier | 20–100 | 20–90 | 35–75 |
| Plasticizer | 0–45 | 15–40 | 15–35 |
| Stabilizer | 0–5 | 0–3 | 0.01–2 |
| Formulations C | | | |
| Resin Grade Thermoplastic PHBV | 0–50 | 10–50 | 15–40 |
| PLA Tackifier | 20–100 | 20–90 | 40–75 |
| Plasticizer | 0–45 | 15–40 | 15–35 |
| Stabilizer | 0–5 | 0–3 | 0.01–2 |

¹Polyester comprising 2-hydroxy propionic acid.

EXAMPLES AND DATA

The following examples serve to further illustrate the hot melt adhesives of the invention. The adhesives were tested and test data relating to adhesion and thermal stability follows the operating examples. Further, the examples and data contain a best mode.

EXAMPLES

Lactic Acid Based Tackifying Resin

Example 1A
From Lactic Acid

To a nitrogen purged reaction vessel was added 500 g 85% lactic acid and 17.00 g benzyl alcohol. The mixture was slowly heated to 200° C. while removing water by distillation. The mixture was heated at 200° C. for 4 hours, reduced to 165° C. and vacuum applied for 3 hours. 26.45 g Desmodur H was then added dropwise at 120° C. and allowed to react an additional 1 hour to yield a yellow brittle solid.

Example 1B
From Lactic Acid

To a reaction vessel purged with dry $N_2$ for 1 hour at 120° C. was added 250 g d,l-lactide, 4.5 g 1,4-butane diol and 2 drops Metacure T-9 catalyst under positive nitrogen pressure. The mixture was purged with dry $N_2$ for an additional 1 hour and the temperature then raised to 150° C. for 18 hours to yield a light yellow brittle solid.

Example 1C
From Polylactide

To a nitrogen purged reaction vessel was added 500 g d,l-polylactide (Mn about 90,000 g/mole), 24.16 g benzyl alcohol and 1.0 g Fascat 9100. The temperature was slowly raised to 190° C. for 6 hours to yield a yellow brittle solid.

Experimental compostable HMAs have been formulated from about 20–25 wt-% of a compostable thermoplastic (A), with 50–60 wt-% of an experimental compostable poly (lactic acid), (PLA) based tackifying resin (B), and 20–25 wt-% of two commercially available compostable plasticizers (C, Benzoflex 9-88, D Sanitizer 160-butyl benzyl phthalate.

The experimental tackifying resin (B) is representative of a variety of PLA-based tackifying resins developed in our laboratories. This resin possesses a 60° C. ring and ball softening point and was shown to be compostable. This strongly contrasts with previous testing which determined that three polar commercial tackifying resins based on natural products were not compostable. The two commercial plasticizers C and D were found to be compostable.

Two HMA formulations (I and II) were bonded to a compostable poly(lactic acid) spun bond non-woven fabric at 15 psi and 60° C. for 1 second. After conditioning at ambient temperature for 24 hours, adhesive performance was measured by an in-house T-Peel method. Viscosity measurements were determined at 150° C. after 1 and 4 hours using a Brookfield viscometer (spindle 27 at 10 rpm). Formulation II was run at 135° C. after 1, 4 and 15 hours using a spindle #27 at 20 rpm.

TABLE 1

| HMA Formulation I* | Wt % | |
|---|---|---|
| Resin grade polylactide (99% l-isomer) polymer | 20.0 | |
| Lactic acid based tackifying resin | 54.0 | |
| Sanitizer 160 | 24.5 | |
| Irganox 1010 (stabilizer) | 1.0 | |

| Substrate | T-Peel Strength (Avg. g) | Failure Mode |
|---|---|---|
| Poly(lactic acid) | 166 g | C.F. |
| Poly(vinyl alcohol) | ≈0 g | A.F. |
| Starch-polycaprolactone | 31 g | A.F. |
| Polycaprolactone | 140 g | C.F. |

| | | |
|---|---|---|
| *Kraft to Kraft 100 g peel failure temperature (H.B. Fuller test method TMHM-023) for HMA (III) | | 86° F. |
| Kraft to Kraft 500 g shear failure temperature (H.F. Fuller test method TMHM-023) for HMA (III) | | 90° F. |

| Viscosity hours | 5750 at 1 hour | 4810 at 4 hours | 4000 at 15 |

TABLE 2

| HMA Formulation II | Wt % | |
|---|---|---|
| PHBV (22% valerate) | 25 | |
| PLA based tackifer (benzyl alcohol end capped 50/50 d, l-polylactic acid with $M_n$ = 3,300 g/mole. | 55 | |
| Benzoflex 9-88 SG | 20 | |

| Substrate* | T-Peel Strength (Avg. g)* | Failure Mode** |
|---|---|---|
| Poly(lactic acid) | 479 | S.F. |
| Poly(vinyl alcohol) | 401 | S.F. |
| Starch-Polycaprolactone | ≈0 | A.F. |
| Polycaprolactone | ≈0 | A.F. |
| Viscosity (at 150° C.) | 15,000 cps at 1 hour | 8,500 cps at 4 hours |

*Various compostable films bonded to a compostable PLA non-woven.
**A.F. = Adhesive Failure, C.F. = Cohesive Failure, S.F. = Substrate Failure

TABLE 3

| HMA Formulation III | Wt % |
|---|---|
| PHBV (22% valerate) | 23 |
| PLA based tackifer (benzyl alcohol end capped 50/50 d, | 57 |

TABLE 3-continued

| HMA Formulation III | Wt % |
|---|---|
| l-polylactic acid with $M_n$ = 3,300 g/mole. Sanitizer 160 | 20 |

| Substrate* | T-Peel Strength (Avg. g) | Failure Mode** |
|---|---|---|
| Poly(lactic acid) | 338 | S.F. |
| Poly(vinyl alcohol) | 287 | S.F. |
| Starch-Polycaprolactone | 206 | A.F./S.F. |
| Polycaprolactone | ≈0 | A.F. |
| Viscosity (at 150° C.) | 11,500 cps at 1 hour | 6,000 cps at 4 hours |

*Various compostable films bonded to a compostable PLA non-woven.
**A.F. = Adhesive Failure, C.F. = Cohesive Failure, S.F. = Substrate Failure In all cases, substrate failure indicates failure of the non-woven. T-Peel values of samples that showed adhesive failure were reported to show that the biodegradable substrates possessed adequate strength. For comparison, a standard commercial HMA applied to polyethylene and bonded to a polyolefin spun bond non-woven fabric (1.2 mg/inch) showed T-peels values of about 150 g. Therefore, these compostable HMAs possess adhesive properties that fall within a usable range.

The compositions used in the hot melt adhesive compositions formulated below when tested for biodegradability and compostability were tested under the ASTM D5338-92 Standard Test Method for Determining Aerobic Biodegradation of Plastic Materials Under Controlled Composting Conditions. The compositions below were tested for peel strength to determine bonding strength of an adhesive when subjected to a dynamic peel force. In the test, fine lines were applied at 2-3 mg/linear inch directly to substrates measuring 1×6 inches. The samples were pressed at 15 psi and 140° F. for 1 second. T peels were run on 7 to 8 samples at room temperature using a cross set speed of 12 inches per minute and a 25 second dwell time. The cross head motion is initiated and continued for 10 seconds recording the peak and average peel values. Typically, the results are reported including average maximum force to rupture (in grams), failure mode (adhesive failure, substrate failure or cohesive failure).

In the following tables the formulations were blended by combining the materials in a steel container with a high speed mixer. While the order of addition is not critical, the materials were made by first melting the tackifier and then adding the resin grade thermoplastic followed by the plasticizer.

Kraft to Kraft heat resistance testing was performed by laminating 18 pound Kraft paper to form a one inch by one inch bond area with an approximate bond thickness of 5 mils. Weights were attached in the peel and shear modes and the samples placed in an oven. The temperature was raised at 25° C. and the temperature at which the bond delaminated was recorded.

The above discussion, examples and embodiments illustrate our current understanding of the invention. However, one skilled in the art will appreciate that various changes may be made without departing from the spirit and scope of the invention. Thus, the invention resides wholly in the claims hereafter appended.

We claim:

1. A biodegradable/compostable hot melt adhesive composition comprising:

(a) a linear thermoplastic polyester resin comprising 1–95 wt-% of a hydroxy butyric acid composition and about 5–35 wt-% of a hydroxy valeric acid composition; and (b) about 20–90 wt-% of a biodegradable tackifying resin composition comprising a polylactic acid polymeric composition having a molecular weight (Mn) of less than about 30,000 grams per mole, a $T_g$ of less than about 110° C.

2. The composition of claim 1 wherein the tackifying resin has a $T_g$ of about 10 to 80° C.

3. The composition of claim 1 wherein the adhesive additionally comprises about 1–50 wt-% of a biodegradable/compostable plasticizer.

4. The composition of claim 1 wherein the biodegradable/compostable thermoplastic resin comprises a polymeric material having a molecular weight (Mn) of greater than 40,000 grams per mole.

5. The composition of claim 1 wherein the tackifying resin comprises a polymer comprising 40–100 mole-% of l-lactic acid and 0–60 mole-% of d-lactic acid.

6. The composition of claim 1 wherein the tackifying resin comprises a polymer comprising 50–95 mole-% of l-lactic acid and 1–50 mole-% of d-lactic acid.

7. The composition of claim 1 wherein the plasticizer comprises an ester composition derived from an aromatic or aromatic mono-, di- or tri-carboxylic acid.

8. A biodegradable/compostable hot melt adhesive composition consisting essentially of:

a) about 10–50 wt-% of a biodegradable/compostable thermoplastic resin selected from the group consisting of a polyester urethane resin and a linear polyester resin comprising 1–95 wt-% of a hydroxy butyric acid composition and about 5–35 wt-% of hydroxy valeric acid composition, and b) about 20–90 wt-% of a biodegradable tackifying resin composition comprising polylactic acid composition having a molecular weight (Mn) of less than about 20,000 grams per mole and a $T_g$ of less than about 110° C.

9. The composition of claim 8 wherein the tackifying resin comprises about 95 mole-% of lactic acid monomer and has a $T_g$ of less than about 0° to 50° C.

10. The composition of claim 8 wherein the $T_g$ of the thermoplastic is about 50° to 65° C., the $T_g$ of the tackifying resin is about −10° to 50° C. and the $T_g$ of the adhesive is about −25° to 25° C.

11. The composition of claim 8 wherein the adhesive additionally comprises about 1–50 wt-% of a biodegradable/compostable plasticizer.

12. The composition of claim 8 wherien the biodergadable/compostable thermoplastic resin comprises a polymeric material having a molecular weight (Mn) of greater than 40,000 grams per mole.

13. The composition of claim 8 wherein the tackifying resin has a $T_g$ of about 10° to 80° C.

14. The composition of claim 8 wherein the tackifying resin has a $T_g$ of about −20° to 60° C.

15. The composition of claim 8 wherein the thermoplastic polyester urethane has a molecular weight (Mn) greater than about 30,000 grams per mole.

16. The composition of claim 8 wherein the tackifying resin comprises 40–100 mole-% of L-lactic acid and 0–60 mole-% of D-lactic acid.

17. The composition of claim 8 wherein the tackifying resin comprises about 95 mole-% of lactic acid monomer.

18. A biodegradable/compostable hot melt adhesive composition consisting essentially of
   a) about 10–50 wt-% of a biodegradable/compostable thermoplastic resin selected from the group consisting of a polyester urethane resin and a linear polyester resin comprising 1–95 wt-% of a hydroxy butyric acid composition and about 5–35 wt-% of hydroxy valeric acid composition;
   b) about 20–90 wt-% of a biodegradable tackifying resin composition comprising polylactic acid composition having a molecular weight (Mn) of less than about 20,000 grams per mole and a $T_g$ of less than about 110° C.; and
   c) about 1–50 wt-% of a compatible biodegradable/compostable plasticizer.

19. The composition of claim 18 wherein the plasticizer comprises an ester composition derived from an aliphatic, or an aromatic mono-, di- or tri-carboxylic acid.

20. The composition of claim 18 wherein the tackifying resin comprises about 95 mole-% of lactic acid monomer and has a $T_g$ of less than about 0° to 50° C.

* * * * *